United States Patent [19]

Polvara

[11] 4,110,052
[45] Aug. 29, 1978

[54] MULTIPLE ELEMENT FOR FORMING VARIOUS STRUCTURES WHEN CONNECTED TO BOX-FORM PANELS FOR FURNITURE OR THE LIKE

[75] Inventor: Giulio Polvara, Milan, Italy

[73] Assignees: Beylerian Limited, New York, N.Y.; Kartell, S.p.A., Milan, Italy

[21] Appl. No.: 591,829

[22] Filed: Jun. 30, 1975

[51] Int. Cl.² ............................................. A47B 47/04
[52] U.S. Cl. .................................... 403/295; 108/111; 312/111
[58] Field of Search ..................... 52/753 C, 283, 281, 52/585; 108/111, 153; 312/111; 403/295, 205

[56] References Cited

U.S. PATENT DOCUMENTS

| | | | |
|---|---|---|---|
| 3,435,575 | 4/1969 | Pottiez | 312/111 |
| 3,685,465 | 8/1972 | Haumer | 108/111 |
| 3,736,035 | 5/1973 | Brown et al. | 312/111 X |
| 3,754,806 | 8/1973 | Nakagawa | 312/111 |
| 3,826,206 | 7/1974 | Ruggles | 52/585 |
| 3,901,572 | 8/1975 | Litchfield | 312/111 |

Primary Examiner—Andrew V. Kundrat
Attorney, Agent, or Firm—Edwin E. Greigg

[57] ABSTRACT

A device for facilitating assembly of shelves, bookcases, dividers, and other similar structures, including an elongated tubular body having integrated therewith multiple offstanding jointing means to which suitable panels can be attached for producing a completed structure.

4 Claims, 13 Drawing Figures

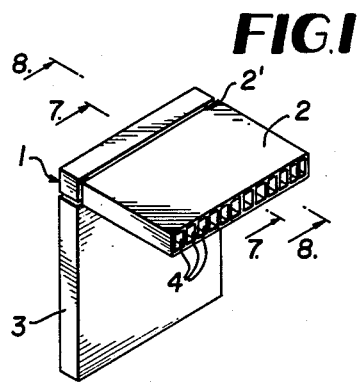
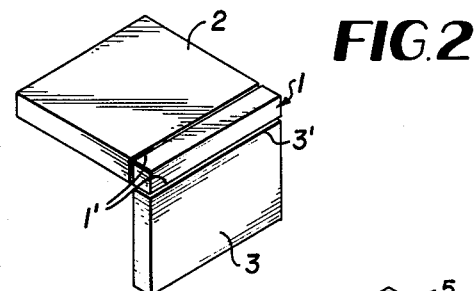
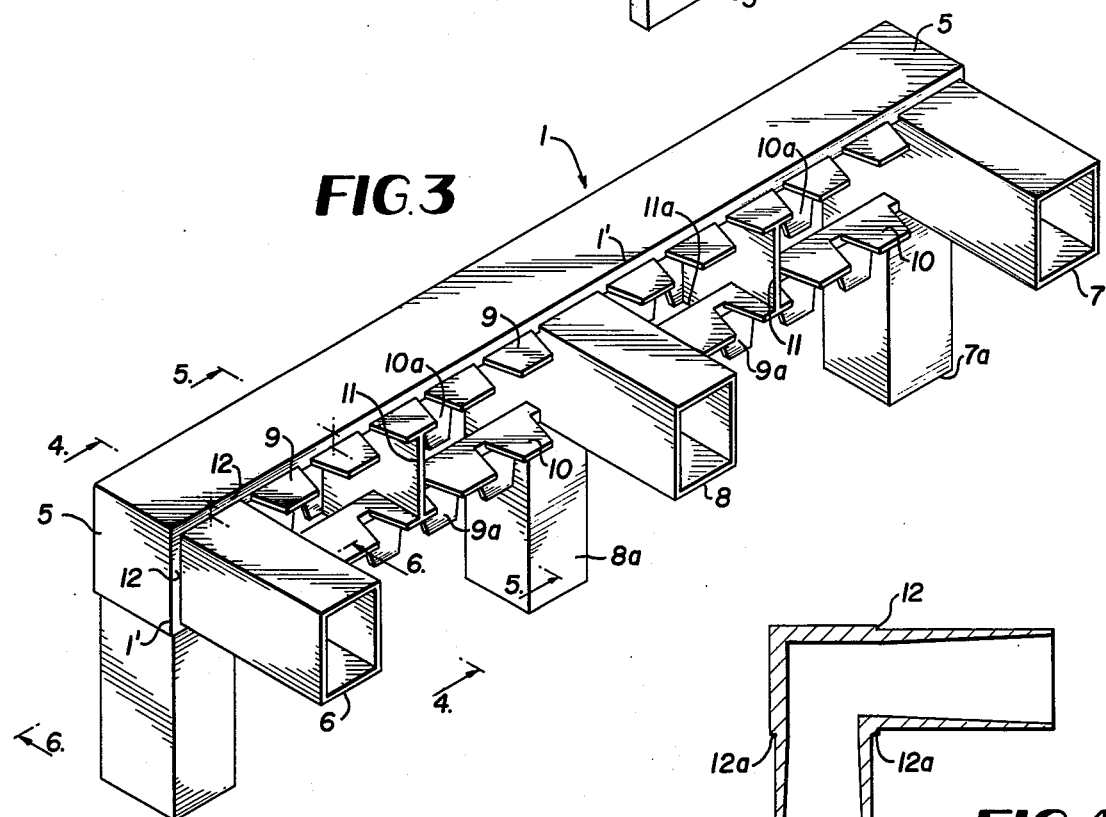
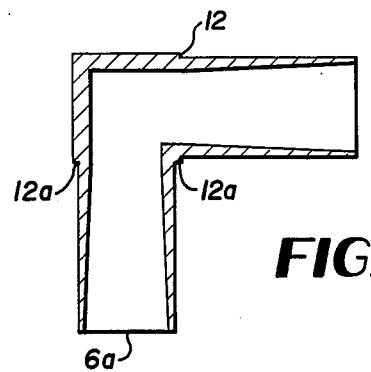
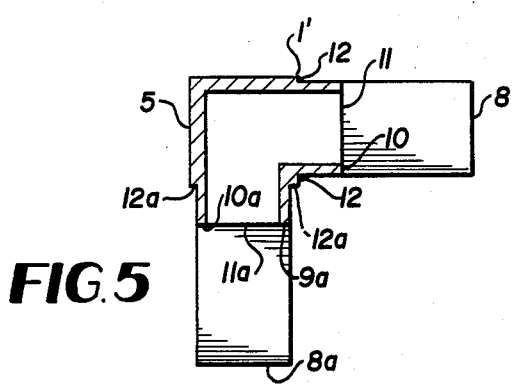
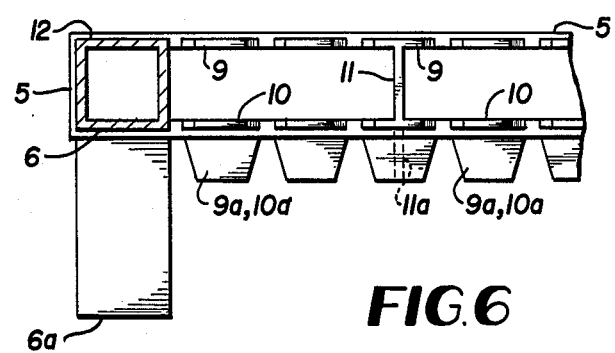

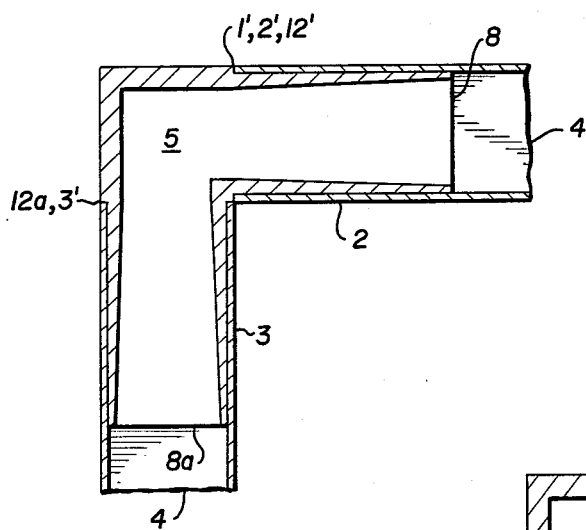
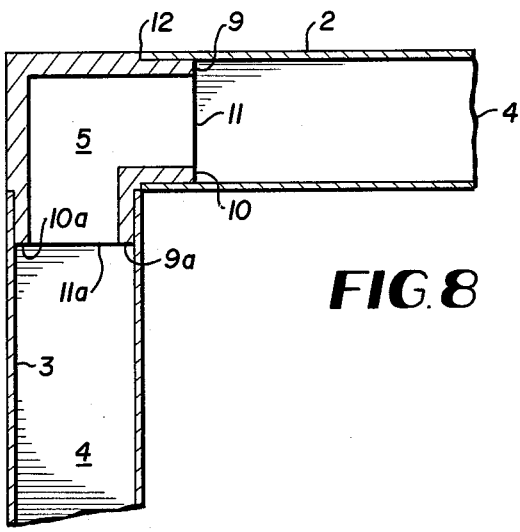
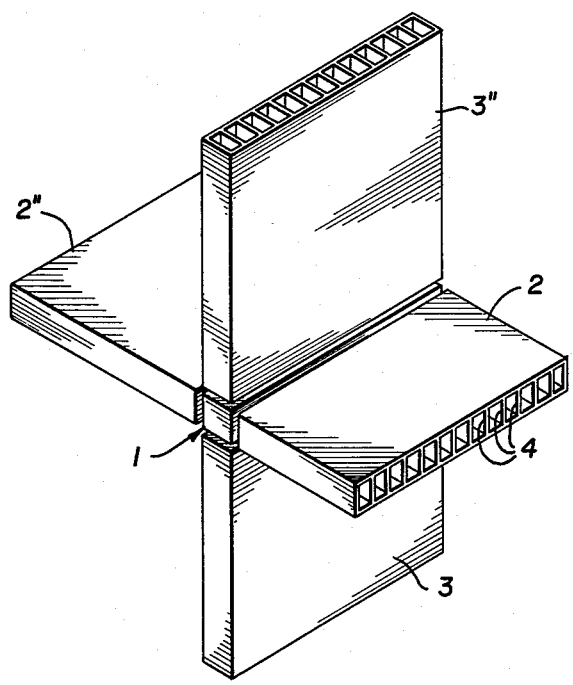

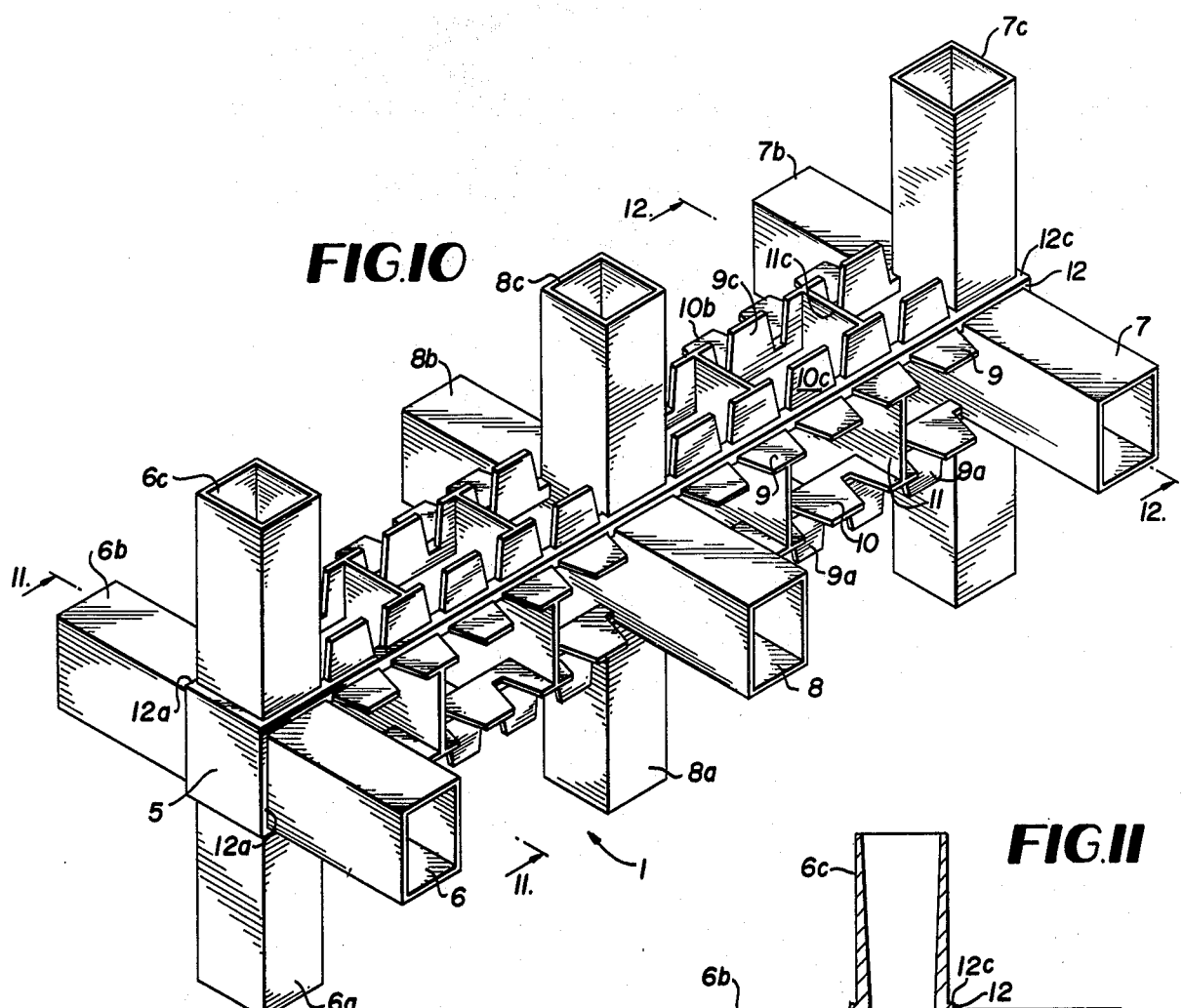
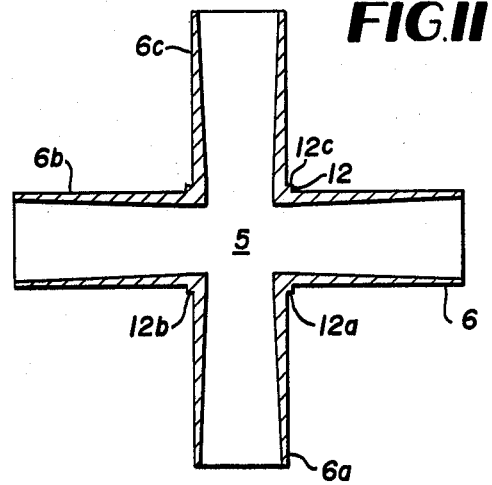
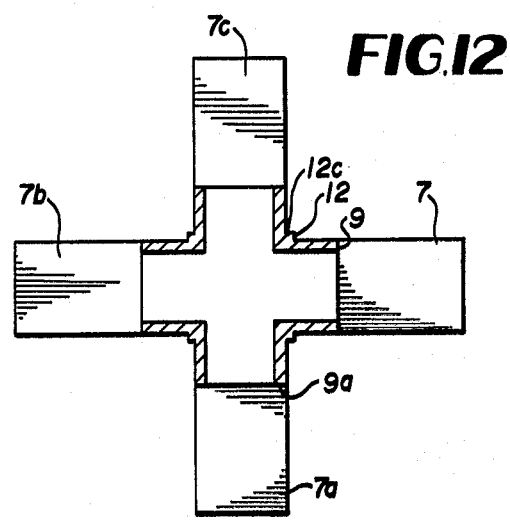
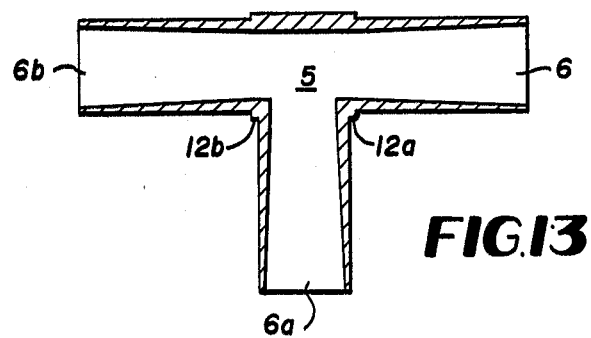

MULTIPLE ELEMENT FOR FORMING VARIOUS STRUCTURES WHEN CONNECTED TO BOX-FORM PANELS FOR FURNITURE OR THE LIKE

BACKGROUND OF THE INVENTION

The present invention relates to a multiple connecting element for box-shaped panels designed to form with the latter various structures such as furniture in general, shelves, book cases, dividers, etc. Through its own special configuration the connecting element according to the invention provides for the closing of the gap at the point of contact between the panels and the joints and supplies the panels which are joined to it with a high degree of resistance and rigidity.

Various types of structures are already known which are designed to form furniture or the like and which consist of box-shaped panels, stamped or extruded from plastic material, etc., and joined to connecting elements at their ends.

These known structures can be subdivided into various groups which all have a number of disadvantages restricting their use.

There are, for example, panel elements which are connected together without joints to form shelves or the like. These have the disadvantage of being unstable when loaded or of requiring an excessive number of reinforcing panels. Another known structure consists of panels having joints incorporated therein. This structure cannot be used to obtain varied structures and, in addition, the structures which can be produced are not very stable. Structures consisting of panels connected by metal fastening means are also known. However, these are very difficult to assemble. They also lack transversal resistance and comprise a large number of parts. Other known types of structures consist of poles connected by means of joints designed to form rectangular frames on which panels are mounted. However, the panels do not help support the structure, are difficult to join and have insufficient resistance to bending.

SUMMARY OF THE INVENTION

The present invention relates to a multiple joint to be connected to box-shaped panels to form a structure of any desired type which not only does not have the above-mentioned disadvantages but which possesses other advantages such as considerable bending resistance, complete closing of the gaps between the joints and the panels over the entire length of the head section, total participation of the panel in the lateral and bending resistance of the entire structure as well as other advantages which will be indicated hereinafter.

According to the present invention the multiple joint consists of a tubular body having a square section which is closed at the ends. The length of the tubular body is equal to the width of the box-shaped panel to which it is joined and comprises on one or more of its sides at least two jointing means at opposite ends thereof and one or more intermediate jointing means, each having an overall section equal to that of the longitudinal spaces of the box-shaped panel to which they are joined. Between the end and intermediate jointing means there are provided a series of support means having an open section and lying parallel with and corresponding to the upper and lower planes of the panel. Some of these intermediate support means may be reinforced with transverse ribs forming an I-shape configuration with said support means. There is also formed between the single tubular body and the jointing and support means on each side of the tubular body, a rectilinear shoulder having an identical step, dimensions and extension to the overall perimeter of the box-shaped panel to be joined to this multiple connecting element.

More specifically, in the simpler case of a connecting element for two box-shaped panels disposed at an angle of 90° with respect to each other, the connecting element consists of a tubular body having a square section. The tubular body extends over the entire width of the panel and comprises at the two ends and in the center, three jointing means on one plane and three jointing means on a perpendicular plane which are aligned with the former. In the two gaps lying between adjacent co-planar jointing means there is disposed a row of parallel support means having an open section. These support means are also disposed according to the two planes disposed at right angles to each other. At least some of these parallel support means are reinforced with transverse ribs. Furthermore, the stepped shoulder which extends over the entire perimeter of both sides forms a closure with the panel. During connection with the box-shaped panel having a series of identical, parallel longitudinal channels, the jointing means are inserted in the end channels and in the intermediate channel in such a way as to be gripped by pressure within the same. The support means having an open section are inserted between the other channels which remain in supporting contact in such a way as to constitute a continuous support for the entire transverse edge of the panel.

Connecting elements having the same configuration are provided for three and four panels. In the case of these connecting elements the rows of jointing and support means are disposed on three or four sides of the tubular body. There is also an element having said means only on one side. This element can be used as a closing element for a panel having a transverse open end. With the multiple connecting element according to the invention it is possible to construct furniture, shelves, dividers, etc., having the dimensions of the panels, without using fastening means, more particularly, metal fastening means and to obtain considerable bending and torsional resistance in the structure owing to the fact that each channel in the panels contributes to said resistance by cooperating with a jointing means or a support means respectively to form an integral structure.

Other objects, features and advantages of the present invention will be made apparent from the following detailed description of various embodiments thereof provided with reference to the accompanying drawings.

BRIEF DESCRIPTION OF THE DRAWINGS

FIG. 1 represents a multiple connecting element according to the invention connected to two box-shaped panels disposed at right angles to one another. The horizontal panel is facing forwards.

FIG. 2 represents a view of the element shown in FIG. 1 from the opposite side.

FIG. 3 is a perspective view on a larger scale of the complete right-angled connecting element.

FIG. 4 is a transverse sectional view of the jointing means along the line IV—IV of FIG. 3.

FIG. 5 is a sectional view of the support means along the line V—V of FIG. 3.

FIG. 6 is a front view and a partial sectional view along the line VI—VI of FIG. 3.

FIGS. 7 and 8 are sectional views of the connecting element with the panels inserted. The sectional views are along the planes VII—VII and VIII—VIII, respectively, of FIG. 1.

FIG. 9 shows an overall view of a cross-form connecting element with four panels mounted in place.

FIG. 10 is a perspective view of the single cross-form element shown in FIG. 9.

FIGS. 11-12 represent the sections along the lines XI—XI and XII—XII of FIG. 10, and FIG. 13 represents a transverse section of the jointing means of a connecting element for three panels.

DESCRIPTION OF THE PREFERRED EMBODIMENT

FIGS. 1 and 2 shows an angular unit consisting of a multiple connecting element 1 for two panels disposed at right angles to each other, one panel being mounted as a horizontal panel 2 and the other panel as a vertical panel 3.

Both panels have an identical box-shaped form. Their internal space is divided into many equal, longitudinal channels by uniformly distributed walls 4 which are parallel to the short sides of the panel. These panels may be made of plastic material by means of the extrusion process or of wood, metal or any other suitable material. The panels are cut to modular, multiple or sub-multiple measurements or to the desired size of each structure.

In FIGS. 1 and 2 the panels 2 and 3 do not completely rest against the connecting element 1 but are spaced slightly apart so as to leave the end lines 2' and 3' of the panels separate from the line 1' of the element 1 — for reasons of clarity. However, the above-mentioned lines should be fitted together in the manner described hereinafter.

FIGS. 3-6 represent a single multiple connecting element comprising a tubular body 5 having a square section which is closed at the ends and open at the sides where the panels are inserted. The length of the tubular body is equal to the width of the panels.

On each of the sides where the panels are to be connected there are provided jointing means which are disposed at the ends 6, 7 and one or more intermediate jointing means 8. These jointing means project from the body 5, are open at their extremities and have a square section of the same dimensions as the section of the corresponding panel which channels are formed by longitudinal dividing walls, thereby enabling the jointing means to be inserted under a certain amount of pressure and to remain fixed in place by virtue of a force-fit or through the elasticity of the material or by means of glue, adhesives, etc.

In the gap between the jointing means 6, 7, 8 there are provided support means 9 and 10 which are disposed in the manner of two co-planar series. These support means 9 and 10 are shorter than the jointing means and consist of parallel fins which taper in a wedge shape to facilitate their insertion between the corresponding longitudinal channels of the box-shaped panels.

As may be noted in FIGS. 3 and 5, the support means 9, 10 constitute the extension of the inner space of the body 5 and some of these may be reinforced by means of transverse ribs 11 which ribs also form transverse extensions of the body 5 in which they form intermediate closure walls.

Between the perimeter of the base of each jointing and support means and the edge 1 of the tubular body 5 there is a step forming a continuous shoulder 12. The height of this shoulder 12 is equal to the thickness of the sidewalls of the panels 2, 3 to be joined. The above-described jointing and support means are integral with the body 5 and are provided in an identical manner on each side of the body 5 which is to be joined to its respective panel. Thus, in the case of the multiple connecting element shown in FIGS. 3-6 the said means are provided in an identical manner on the two surfaces which are disposed at right angles to each other and are indicated by the same reference numbers, to which the letter a has been added. Thus, there are the joint projections 6a, 7a, 8e and the support projections 9a, 10a with their respective ribs 11a.

The shoulders 12a at the base of the means are also disposed along the associated surface.

In FIGS. 1, 2, 7 and 8 the multiple connecting element 1 according to the invention is connected to the box-shaped panels 2 and 3. In FIG. 7 it may be noted that the jointing means 8, 8a are inserted in the respective channels formed by the walls 4 in the elements 2, 3 and it may also be noted that the edges 1', 2' of the body 5 and the panel are connected flush when the panel is pushed against the shoulder 12.

FIG. 8 represents an identical section to that of FIG. 7, but one which is executed to show the correspondence of the support means 9, 10, 9a, 10a with the ribs 11, 11a.

FIG. 9 shows a multiple cross-form connecting element joined to four box-shaped panels 2, 3, 2", 3" identical to those described above. FIGS. 10, 11 and 12 represent a single cross-form element which includes jointing and support means on all four sides of the tubular body 5. The jointing and support means are designated by the same reference numbers as those of FIGS. 3-6 but with the letters a, b, c.

FIG. 13 represents a multiple element similar to the preceding element but which is intended for the connection of three panels. It is also possible to provide a multiple closing element for the end of a panel which is constructed in the manner described above but which includes projections on only one side of the tubular body 5.

Numerous modifications may obviously be made to the element which has been described. For example, the intermediate jointing means may be omitted in the case of panels having a smaller section and it is possible to provide more than one intermediate jointing means in the case of larger panels and greater loads. It is also possible to vary the form, number and disposition of the support means without departing from the scope of the present invention.

What is claimed is:

1. A connecting element for use in assembling furniture, shelves and the like comprising an elongated tubular body of square section including a pair of exposable walls and further having oppositely disposed closed end walls and at least three equally spaced opposed pairs of right angularly extending tubular jointing means of square section each of said jointing means projecting outwardly from said elongated tubular body from zones spaced inwardly of said end wall and further spaced inwardly from at least one of said exposable walls, said jointing means serving to support plurally perforated planar elements arranged to receive said outwardly projecting jointing means and further including oppositely disposed walls and additional frustum-shaped support means which lie in planes coplanar with said walls.

2. A connecting element as claimed in claim 1, wherein the support means are joined to and reinforced by transverse ribs disposed therebetween, at least some of said ribs and said support means being joined in substantially an I shape in section.

3. A connecting element as claimed in claim 1, wherein said oppositely disposed walls diverge toward an outward extremity thereof such that an opening defined by said walls is greater at an outward extremity thereof than at an inward extremity thereof.

4. A connecting element as claimed in claim 2, wherein the ribs, support means and jointing means cooperate with complementally shaped channels in a panel with opposed planar side walls so as to join said panel to the connecting element such that the opposed planar side walls of said panel lie in coplanar relation with the respective sides of the connecting element, whereby a flush surface is achieved between an adjoining element and an adjoining panel.

* * * * *